Oct. 24, 1939. E. R. FITCH 2,177,521
FLUID PRESSURE BRAKE
Filed Oct. 22, 1937
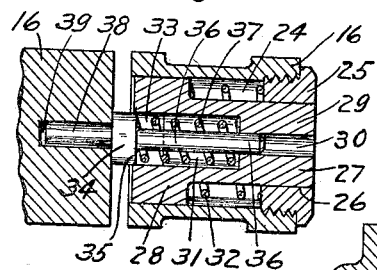
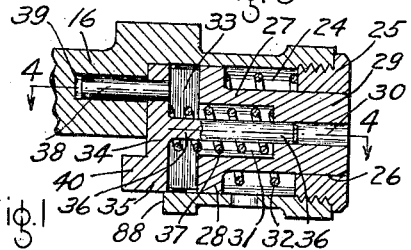
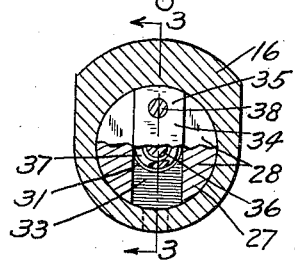
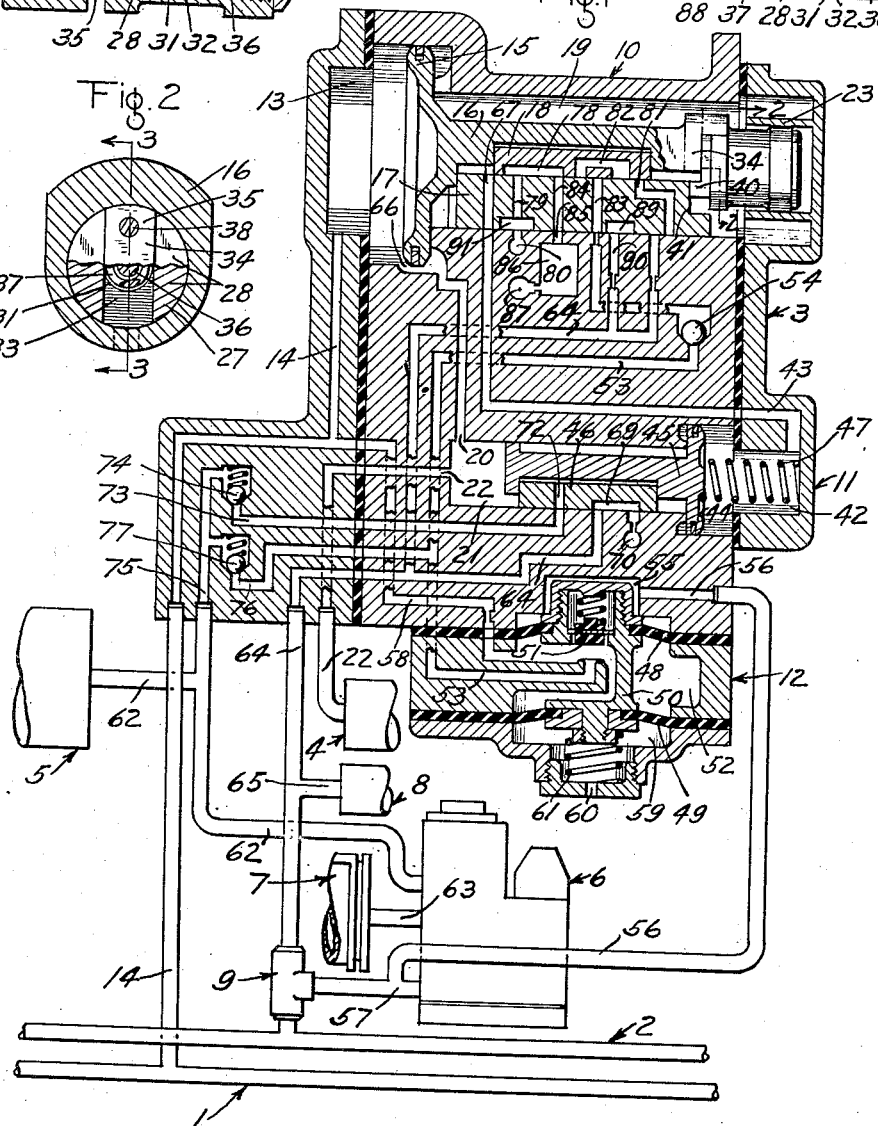
INVENTOR
ELLERY R. FITCH
BY Wm. W. Cady
ATTORNEY Patented Oct. 24, 1939

2,177,521

UNITED STATES PATENT OFFICE

2,177,521

FLUID PRESSURE BRAKE

Ellery R. Fitch, Irwin, Pa., assignor to The Westinghouse Air Brake Company, Wilmerding, Pa., a corporation of Pennsylvania Application October 22, 1937, Serial No. 170,322

20 Claims. (Cl. 303—41)

This invention relates to fluid pressure brake equipment for railway rolling stock and more particularly to that type of equipment shown in a prior application of Ellis E. Hewitt and Donald L. McNeal, Serial No. 160,562, filed August 24, 1937, which is particularly adapted for use in high speed train service and which may be controlled either automatically or by straight air.

In some forms of the above mentioned type of brake equipment, but not in the equipment covered by the Hewitt and McNeal application, it has been discovered that when a straight air application of the brakes is being effected, the automatic portion of the equipment, due to unavoidable fluctuations in brake pipe pressure, has a tendency to move from its normal release position to a quick service position in which fluid under pressure is locally vented from the brake pipe. In response to the resulting reduction in brake pipe pressure, the automatic portion will move to application position and an undesired automatic application of the brakes is effected, thus seriously interfering with the proper control of the brakes by straight air. It is therefore an object of the present invention to provide a fluid pressure brake equipment of the above mentioned type with novel means for stabilizing the automatic portion thereof against unintentional movement to application position.

As shown in the above mentioned Hewitt and McNeal application, it is the usual practice to employ a double check valve device for controlling communication between the straight air pipe and the brake application and release pipe or passage and for also controlling communication between the supply passage of the automatic portion of the equipment and said application and release pipe or passage. This check valve device, when a straight air application of the brakes is being effected, functions to isolate the automatic portion from the application and release pipe. However, there is a possibility of leakage of fluid under pressure from the application passage past the seated check valve to the automatic supply passage and any chambers connected therewith, which supply passage and chambers, in some forms of the equipment, are normally connected to the atmosphere through the medium of valve means embodied in the equalizing portion of the automatic portion of the equipment, which valve means is adapted to be caused to operate to close said communication upon movement of the equalizing portion from release position toward quick service position. With the atmospheric communication from the automatic supply passage and chambers thus closed there is no way for fluid which may leak into the passage to escape, so that the pressure of fluid in the passage and chambers in communication therewith will be increased according to the rate of leakage and duration of the straight air application of the brakes. Now when in releasing the straight air brake application, the pressure of the straight air pipe has been reduced slightly below the pressure unintentionally built up in the automatic supply passage, the check valve will be caused to move from its upper position to a position to cut off the further release of fluid under pressure from the application and release passage, with the result that the brakes will be maintained applied with a brake cylinder pressure substantially equal to the pressure of fluid bottled up in the automatic supply passage. This is very objectionable in that the operator has no way of knowing that some of the brakes may be thus maintained applied, so that while the train is in motion the usual brake shoes will drag on the wheels and cause unnecessary wear and heating of both the shoes and the wheels, but more serious damage is done when the retained brake application is such that the wheels are caused to slide on the track rails causing flat spots to be worn on the wheels. The time when this is most likely to occur is when the train is put in motion after having been brought to a stop. It is therefore another object of the invention to provide means for stabilizing the equipment against unintentional movement to the position in which the atmospheric communication between the automatic supply passage is closed. This object is attained by means of a stabilizing mechanism which is adapted to maintain the equalizing portion of the equipment in its normal release position against the unavoidable fluctuations in brake pipe pressure.

Other objects and advantages will appear in the following more detailed description of the invention.

In the accompanying drawing Fig. 1 is a diagrammatic view, mainly in section, of a fluid pressure brake equipment embodying the invention; Fig. 2 is an enlarged fragmentary vertical sectional view taken on the line 2—2 of Fig. 1; Fig. 3 is a fragmentary longitudinal sectional view taken on the line 3—3 of Fig. 2; and Fig. 4 is a fragmentary horizontal sectional view taken on the line 4—4 at Fig. 3.

As shown in the drawing the equipment may comprise a brake pipe 1, a straight air pipe 2, a brake controlling valve device 3, and auxiliary reservoir 4, a supply reservoir 5, a relay valve device 6, a brake cylinder 7, a displacement volume chamber 8, and a double check valve device 9.

The brake controlling valve device 3 may comprise an emergency portion and a pipe bracket which may be of substantially the same construction as the corresponding parts of the equipment shown in the above mentioned Hewitt and McNeal application, and may also comprise an equalizing portion which may have many of the operating characteristics of the corresponding portions of the equipment shown in said application. The present invention relates particularly to the control of the equalizing portion and in view of this and for the purpose of simplifying the showing and description of the invention the emergency portion, pipe bracket and certain details of the equalizing portion not essential to a clear understanding of the invention have been omitted.

As shown in the drawing, the equalizing portion of the brake controlling valve device 3 comprises an equalizing valve device 10, a release relay valve device 11 and a combined cut-off and quick service modifying or limiting valve device 12.

The equalizing valve device 10 may comprise a casing having a piston chamber 13 which is connected to the brake pipe 1 by way of a passage and pipe 14. The chamber 13 contains a piston 15 having a stem 16 adapted to operate a main slide valve 17 and an auxiliary slide valve 18 contained in a valve chamber 19 which is connected to the auxiliary reservoir 4 by way of a passage 20, valve chamber 21 of the release relay valve device 11 and a passage and pipe 22.

The rear end portion of the piston stem 16 is preferably of cylindrical form and is slidably guided by an annular flange 23 which is carried by the casing. This portion of the stem is provided with a central longitudinal bore 24 which is closed at one end by a plug 25 having a screw threaded connection with the stem, said plug being provided with a central bore 26. Below the lower surface of the major portion of the piston stem the other end of the bore 24 is open as shown best in Fig. 3. Contained in the bore 24 and movable longitudinally of the piston stem is a plunger 27 having an annular head 28 which is slidably guided in the bore 24 and having a stem 29 which is slidably guided in the bore 26 of the plug 25, which stem 29 is provided with a central longitudinal bore 30 and a counterbore 31. Also contained in the bore 24 and interposed between and operatively engaging the rear face of the head 28 of the plunger and the inner end of the plug 25 is a spring 32, which, as will hereinafter more fully appear, is adapted to yieldably resist movement of the equalizing piston and associated parts to initial quick service position.

The front face of the annular plunger head 28 is provided with a cross groove 33 in which there is slidably mounted the rectangular head 34 of a plunger 35. Extending rearwardly from the head 34 through the counterbore 31, with which the plunger stem 29 is provided, and into the bore 30 is a stem 36 which, in the present embodiment of the invention is shown integral with the head 34.

Contained in the counterbore 31 and interposed between and operatively engaging the rear face of the plunger head 34 and the inner end surface of the counterbore is a spring 37 which, as will hereinafter more fully appear is adapted to prevent accidental movement of the equalizing piston 15 from its normal release position in response to slight fluctuations in brake pipe pressure.

The plunger 35 is movable longitudinally relative to the plunger 27 and the stem of plunger 35 is slidably guided within the bore 30 of the plunger 27.

Rigidly secured to the plunger head 34 and extending outwardly from the front face thereof is a guide pin 38 which extends into a longitudinal bore 39 provided in the piston stem 16. This pin is arranged at one side of the center of the head and is slidably guided in the bore 39. This pin arrangement is provided for the purpose of preventing the plunger 35 from rotating relative to the piston stem 16. It should here be mentioned that since the plunger head 34 is in engagement with the head 28 of the plunger 27, the pin arrangement will also prevent this latter plunger from rotating relative to the piston stem 16, thus both plungers will be maintained in their proper positions relative to each other and to the piston stem.

At the other side of the plunger head 34 and extending outwardly from the front face thereof and through the open end portion of the bore 24 is a lug 40, which at all times is adapted to engage with a rear surface 41 of the main slide valve 17.

The release relay valve device 11 may comprise a casing which, in the present embodiment of the invention, is integral with the casing of the equalizing valve device 10. Provided in the casing is a piston chamber 42 which is connected to a passage 43 leading to the seat for the equalizing main slide valve 17 and which contains a piston 44 having a stem 45 adapted to operate a slide valve 46 contained in valve chamber 21, which chamber 21 is in constant open communication with the equalizing slide valve chamber 19 by way of passage 20, and in constant open communication with the auxiliary reservoir 4 by way of passage and pipe 22. Also contained in the piston chamber 42 and interposed between and operatively engaging the piston 44 and casing is a spring 47 which normally maintains the piston and thereby the slide valve 46 in their proper release position as shown in Fig. 1.

The combined cut-off and quick service modifying or limiting valve device 12 is provided for the same purpose as the corresponding valve device included in the apparatus fully shown described and claimed in the aforementioned Hewitt and McNeal application, namely, for cutting off the final quick service flow of fluid from the brake pipe when in effecting an application of the brakes, the pressure of fluid in the piston chamber of the relay valve device 7, which is substantially the same as brake cylinder pressure, has been increased to about fourteen pounds and secondly, to maintain the initial quick service venting communication closed when a release of the brakes is being effected and thirdly, to maintain communication between the brake pipe and the supply reservoir closed as long as the pressure in the relay piston chamber is higher than the setting of the valve device.

This valve device 12 has substantially the same operating characteristics as the corresponding valve device shown in the Hewitt and McNeal application but differs somewhat in detail and is briefly described as comprising a casing in which there is mounted spaced flexible diaphragms 48 and 49 adapted to operate a follower 50 which extends between and is secured to both diaphragms for actuating a valve 51 to control communication from the chamber 52 located between the diaphragms and a passage 53 leading to the seat for the equalizing main slide valve 17, there being a ball check valve 54 interposed in the passage to prevent back flow of fluid through the passage 53 to the chamber 52. At one side of the diaphragm 48 is a chamber 55 which is connected through a passage and pipe 56 to an application and release pipe 57 leading to the piston chamber of the relay valve device 6. The chamber 52 is in constant open communication with the brake pipe 1 through a restricted passage 58 and passage and pipe 14. At one side of the diaphragm 49 is a chamber 59 which is open to the atmosphere through a passage 60. Contained in chamber 59 and interposed between and operatively engaging the casing and the follower 50 is a spring 61 which normally maintains the follower in a position to maintain the valve 51 out of closing relationship with the passage 53 as shown in Fig. 1.

The relay valve device 6 is provided for the purpose of supplying fluid under pressure from the supply reservoir 5 to the brake cylinder 7 to effect an application of the brakes and also for the purpose of venting fluid under pressure from the brake cylinder to effect a release of the brakes, and is adapted to be controlled either by the straight air portion of the equipment or by the automatic portion.

This relay valve device may be of substantially the same construction as the relay valve device disclosed and claimed in a pending application of Ellis E. Hewitt, Serial No. 74,202, filed August 17, 1934, and for this reason a detailed description of the device in the present application is deemed unnecessary. It should here be mentioned that with the several parts of the equipment in release position, the relay valve device connects the brake cylinder 7 to atmosphere and that when in effecting an application of the brakes fluid under pressure is supplied through pipe 57 to the piston chamber of the relay valve device, the device functions to first close the atmospheric communication from the brake cylinder and to then supply fluid under pressure from the supply reservoir pipe 62 to the brake cylinder by way of a pipe 63. When, in effecting a release of the brakes, fluid under pressure is vented from the pipe 57 and consequently from the relay piston chamber, the device functions to vent fluid under pressure from the pipe 63 and brake cylinder to the atmosphere.

The double check valve device 9 is for the purpose of conditioning the equipment for either straight air or automatic operation and is automatically operative to its proper conditioning position when fluid under pressure is supplied thereto in initiating either a straight air or an automatic application of the brakes.

This device may be of substantially the same construction as the corresponding device shown and described in the aforementioned Hewitt and McNeal application and is here briefly described as comprising a casing having a passage connected to the straight air pipe, a passage connected to the automatic application and release pipe 64 leading from the seat for the equalizing main slide valve 17, and a passage connected to the pipe 57 leading to the piston chamber of the relay valve device 6. Contained in the casing is a double check valve which, when a straight air application of the brakes is initiated moves to cut off communication between the pipe 64 and the pipe 57 and to establish communication between the straight air pipe and the pipe 57, and which when an automatic application of the brakes is being effected, establishes communication between the pipe 64 and the pipe 57 and closes communication between the straight air pipe and pipe 57.

The displacement volume reservoir 8 is provided for the purpose of adding volume to the piston chamber of the relay valve device 6 to control the operation of the relay valve device to provide the proper build-up of brake cylinder pressure in substantially the same manner as this control has been effected by the use of the well known dummy brake cylinder. This device may be of substantially the same construction as the corresponding device shown, described and claimed in an application of Ellis E. Hewitt, Serial No. 156,693, filed July 31, 1937, but for simplification has been shown as comprising a reservoir which is connected through a pipe 65 to the pipe 64.

*Initial charging*

To charge the equipment the operator, through the medium of a suitable brake valve mechanism, causes fluid under pressure to be supplied to the brake pipe 1 and also causes the straight air pipe to be connected to the atmosphere.

Fluid under pressure supplied to the brake pipe flows through pipe and passage 14 to the equalizing piston chamber 13 and from this chamber fluid under pressure flows through a feed groove 66 to the equalizing slide valve chamber 19 and from thence flows through passage 20 to valve chamber 21 of the release relay valve device. Fluid under pressure also flows from chamber 19 through a port 67 in the equalizing main slide valve 17 and passage 43 to the release relay piston chamber 42. From this it will be seen that the fluid pressures acting on opposite sides of the release relay piston 44 will be substantially equal to each other and that by reason of this, the spring 47, maintains the piston and thereby the release relay slide valve 46 in release position as shown in Fig. 1. With the slide valve in this position, the passage 64 and thereby the displacement volume reservoir 8 is connected to the atmosphere by way of a cavity 69 in the slide valve 46 and a passage 70. If the check valve of the double check valve device should be in position for straight air control the piston chamber of the relay valve device 6 is connected to the atmosphere by way of pipe 57 and the straight air pipe 2 but if it is in position for automatic control the relay piston chamber is connected to the atmosphere by way of pipe 57, pipe and passage 64, cavity 69 in the release relay slide valve 46 and passage 70. With the piston chamber of the relay valve device connected to the atmosphere through either of the two circuits just traced, the device establishes communication from the brake cylinder 7 to the atmosphere in the usual manner.

From the valve chamber 21 of the release relay valve device fluid under pressure flows through passage and pipe 22 to the auxiliary reservoir 4. Fluid under pressure also flows from valve chamber 21 to the supply reservoir by way of a port 72 in the release valve slide valve 46, a passage 73, past a ball check valve 74, a passage 75 and pipe 62.

From the brake pipe passage 14 fluid under pressure flows through passage 53, chamber 52 of the combined cut off and quick service modifying valve device, past the unseated valve 51, passage 53, a passage 76, past a spring weighted check valve 77 and passage and pipe 75 to the supply reservoir 5.

*Automatic service application of the brakes*

An automatic service application of the brakes is initiated by effecting a gradual reduction in brake pipe pressure by the use of any desired brake valve mechanism. Since, as before described, the brake pipe 1 is in communication with the equalizing piston chamber 13 the pressure of fluid in this chamber gradually reduces with the brake pipe pressure.

Upon a predetermined, but light reduction in the pressure of fluid in the equalizing piston chamber 13, the pressure of fluid in the equalizing slide valve chamber 19 causes the equalizing piston 15 to move outwardly in a direction toward the left hand, and through the medium of the piston stem 16 shifts the auxiliary slide valve 18 relative to the main slide valve 17. The piston as it is thus being moved cuts off communication from the equalizing piston chamber to the slide valve chamber by way of the feed groove 66 so as to prevent back flow of fluid under pressure from the valve chamber to the piston chamber. As the feed groove is being closed by the equalizing piston, a cavity 78 in the auxiliary slide valve is moved into connecting relationship with the port 67 in the main slide valve and a port 79 also in the main slide valve. The port 67, with the several parts of the equalizing valve device in release position, is in direct communication with the equalizing slide valve chamber 31, but when the auxiliary slide valve is moved relative to the main slide valve this direct communication is cut off and this port and consequently the registering passage 43 and release relay piston chamber 42 are connected through cavity 78, a port 79 in the main slide valve 17 and a passage 80 to the atmosphere. Fluid under pressure now flows from the piston chamber 42 to the atmosphere and as a result of the reduction in pressure in this chamber due to such flow, fluid at auxiliary reservoir pressure in valve chamber 21 causes the piston 44 and thereby the slide valve 46 to move to application position in which the slide valve laps the passage 64, thereby closing the release communication. The slide valve 46 in this position cuts off the charging communication from the valve chamber 21 to the passage 73 leading to the supply reservoir 5.

After the feed groove 66 is closed, the continued movement of the equalizing piston 15 causes the rear end of the auxiliary slide valve 18 to uncover the service port 81 in the main slide valve to the slide valve chamber 19, following which, a cavity 82 in the auxiliary slide valve connects quick service ports 83 and 84 in the main slide valve together. The port 83 is in registration with the passage 53 and the port 84 is in registration with a passage 85 leading to a quick service bulb 86 which is connected to the atmosphere through a restricted passage 87, so that fluid under pressure is now locally vented from the brake pipe to bulb and from thence to the atmosphere.

It will here be noted that since the lug 40 on the plunger 35 is in engagement with the rear surface 41 of the main slide valve with the several parts of the equalizing valve device in release position, the initial movement of the equalizing piston and auxiliary slide valve toward application position will be yieldably resisted by the spring 37 until such time as the feed groove 66 is closed and the cavity 78 of the auxiliary slide valve is in connecting relationship with the passages 67 and 79 of the main slide valve, at which time the front face of the head 28 of the follower 27 is moved by the piston stem into engagement with the rear face of the head of the follower 35. With the followers thus in engagement, the continued movement of the equalizing piston and auxiliary slide valve to quick service position is yieldably resisted by the spring 32. At substantially the same time as the quick service communication is established, the front face of a shoulder 88 on the piston stem engages the rear surface 41 of the main slide valve 17, so that upon the continued movement of the piston toward service position, the main slide valve will be shifted in the same direction.

As the main slide valve continues to move it laps the passage 85, closing off the further quick service flow of fluid from the brake pipe to the atmosphere by way of the quick service bulb 86. At substantially the same time as the passage 85 is lapped, the service port 81, which has been previously uncovered by the auxiliary slide valve 18, is cracked open to the passage 64, so that fluid under pressure now starts to flow from the equalizing piston chamber 19 and connected auxiliary reservoir 4 to the displacement reservoir 8 and check valve device 9, causing the check valve thereof to move to permit fluid under pressure to flow from the pipe 64 to pipe 57 and thereby to the piston chamber of the relay valve device 6, the check valve in this position closing communication between the straight air pipe 2 and the pipe 57. The movement of the double check valve to this position will be prompt since the straight air pipe side of the valve is connected to the atmosphere by way of the straight air pipe 2.

Fluid under pressure thus supplied to the relay piston chamber causes the relay valve device to operate to close the exhaust communication from the brake cylinder to the atmosphere and to open the supply communication to permit fluid under pressure to flow from the supply reservoir 5 to the brake cylinder.

At substantially the same time as the service port is cracked open to the passage 64 a cavity 89 in the main slide valve connects passage 53 to a passage 90 which leads to the passage 64 so that fluid under pressure is locally vented from the brake pipe to the displacement volume reservoir 8 and relay piston chamber.

The piston 15 of the equalizing valve device and slide valves 17 and 18 continue to move to service position in which the service port 81 is fully open to the passage 64, so that the relay valve device will be caused to operate to provide the desired service rate of flow of fluid from the supply reservoir 5 to the brake cylinder. With the main slide valve in this position a tail cavity 91 of the port 79 therein connects the passage 43 to the atmospheric passage 80 so that the piston chamber 42 of the relay valve device is maintained connected to the atmosphere.

Fluid under pressure supplied to the pipe 57 besides flowing to the piston chamber of the relay valve device 6 also flows through pipe and passage 56 to the diaphragm chamber 55 of the combined cut-off and quick service modifying valve device 12, and when the pressure of fluid in this chamber has been increased to around fourteen pounds the diaphragm and follower assembly is moved to seat the valve 51, thus closing off the further quick service flow of fluid from the brake pipe to the displacement volume reservoir and relay piston chamber.

*Automatic release of the service application of the brakes*

To effect a release of the brakes following a service application thereof fluid under pressure is supplied to the brake pipe 1 and flows therefrom to the equalizing piston chamber 13 in the same manner as has before been described in connection with the initial charging of the equipment, causing the several parts of the equalizing valve device to move to their release positions as shown in Fig. 1.

With the auxiliary slide valve 18 and main slide valve 17 of the equalizing valve device in release position the port 67 in the main slide valve is in registration with passage 43 and is open to the equalizing slide valve chamber 19, so that fluid under pressure now flows from this chamber to the piston chamber 42 of the release relay valve device 11, and since the pressure of fluid in this chamber will be equal to auxiliary reservoir pressure in chamber 21, and spring 47 acts to shift the release relay piston 44 and thereby the slide valve 46 to release position as shown in Fig. 1, in which position, the cavity 69 in the valve connects passage 64 to the passage 70 so that fluid under pressure is vented from the displacement volume reservoir 8, piston chamber of the relay valve device 6 and diaphragm chamber 55 of the combined cut-off and quick service modifying valve device 12. Further with the slide valve 46 in this position the port 72 therein registers with passage 73 so that fluid under pressure flows from chamber 21 to the supply reservoir 5.

Upon the venting of the piston chamber of the relay valve device said device is caused to function to vent fluid under pressure from the brake cylinders to the atmosphere thus effecting the release of the brakes. With the diaphragm chamber 55 of the combined cut-off and quick service modifying valve device vented the spring 61 acts to shift the diaphragm assembly 48, 49, 50 upwardly to unseat the valve 51 to establish communication from the brake pipe to the passage 53 which is in registration with the port 83 of the equalizing main slide valve but which port is lapped by the auxiliary slide valve.

*Straight air application of the brakes*

When it is desired to effect a straight air application of the brakes, the operator, by the use of his brake controlling mechanism causes fluid under pressure to be supplied to the straight air pipe 2.

From the straight air pipe 2 fluid under pressure flows to the double check valve device 9 and causes the check valve thereof to assume the position in which it cuts off communication between the pipes 64 and 57 and establishes communication between the straight air pipe and the pipe 57, so that fluid under pressure flows from the straight air pipe to the piston chamber of the relay valve device 6 causing said valve device to function to supply fluid under pressure from the supply reservoir 5 to the brake cylinder 7 to effect an application of the brakes, the increase in brake cylinder pressure being commensurate with the increase in the relay piston chamber pressure.

Fluid under pressure being supplied from the straight air pipe also flows through pipe and passage 56 to the piston 55 of the combined cutoff and quick service modifying valve device 12 and when the pressure of fluid in this chamber has been increased to about fourteen pounds, the device functions to seat the valve 51, thus closing communication from the brake pipe to the passage 53 which leads to the seat of the main slide valve and to the supply reservoir 5. Up to the time the valve 51 is caused to seat the check valve 77 will be maintained seated by the spring which acts thereon. With the communication from the brake pipe to the supply reservoir thus controlled, it will be apparent that during a straight air application of the brakes there is no possibility of direct flow of fluid from the brake pipe to this reservoir, thus insuring against an unintentional reduction in brake pipe pressure which might otherwise be effected, thereby assisting in stabilizing the equalizing piston 13 and associated parts against unintentional movement from their release position.

During a straight air application of the brakes it is essential that the displacement volume reservoir 8, passage 65 and pipe and passage 64 be maintained connected to the atmosphere in order to prevent fluid under pressure which may leak past the check valve of the double check valve device 9 from building up a pressure in these volumes. In the present embodiment of the invention this communication is established by the cavity 69 in the release relay slide valve 46, which valve due to the pressure of fluid in chamber 42 being equal to the pressure of fluid in valve chamber 21 is normally maintained in its proper venting position by the spring 47 acting through the medium of the piston 44 and piston stem 45. From this it is obvious that if fluid under pressure should be vented from the chamber 42, the release relay valve device would be caused to function to cut off the atmospheric communication from the passage and pipe 64, so that if there should be leakage of fluid from the straight air pipe to the pipe 64 the undesired build-up of pressure in the reservoir 8, pipe 65, and passage and pipe 64 would occur.

The reason why such a build-up is undesirable is that it will prevent a straight air release from being effected as will be apparent from the following description.

When it is desired to release a straight air application of the brakes, fluid under pressure is vented from the straight air pipe 2 and consequently from the piston chamber of the relay valve device 6 which causes the relay valve device to function to release fluid under pressure from the brake cylinder to the atmosphere.

When, in effecting a straight air release of the brakes with leakage fluid trapped or bottled up in the displacement volume reservoir 8, pipe 65 and passage and pipe 64, the straight air pipe has been reduced slightly below that of the leakage fluid, the check valve of the double check valve device 9, under the influence of the pressure of the trapped leakage fluid, will be shifted from its straight air control position to its automatic control position, thus cutting off the further release flow of fluid from the piston chamber of the relay valve device 6 and establishing communication from the pipe 64 to this piston chamber. From this it will be seen that the brakes, instead of being entirely released as intended, will be maintained applied with a force commensurate with the pressure of the leakage fluid in the displacement reservoir 8, pipe 65 and pipe and passage 64. The operator has no way of knowing that this undesirable condition exists when he again causes the train to be put in motion, with the result that the brake shoes and wheels will be unduly worn and excessively heated during the remainder of the run, but the more serious damage is done when the retained brake application is such as to cause the wheels to slide on the track rails which sliding action causes flat spots to be worn on the wheels necessitating the replacement of the wheels.

The equalizing piston 15 and auxiliary slide valve 18 need only be moved a short distance from release position toward application position to vent the release relay piston chamber 42 and thereby cause the release relay piston 44 and slide valve 46 to move from their normal release position to the position in which the slide valve 46 laps the passage 64.

Fluctuations in brake pipe pressure due to unavoidable erratic operation of the usual feed valve device, has a tendency to cause the equalizing piston and thereby the auxiliary slide valve to move from their normal release position toward application position but according to the principal feature of the invention the spring 37 acts through the medium of the plunger 35 which is in contact with the main slide valve 17 to counteract such movement, the spring being of such a value as to prevent movement of the equalizing piston under the influence of brake pipe fluctuations of the usual magnitude. From this it will be seen that it requires a predetermined but light brake pipe reduction to cause the equalizing valve device to move to a position to effect the operation of the release relay valve device 11 and that it requires a greater predetermined light reduction in brake pipe pressure to cause the equalizing valve device to move to quick service position.

While one illustrative embodiment of the invention has been described in detail it is not my intention to limit its scope to that embodiment or otherwise than by the terms of the appended claims.

Having now described my invention, what I claim as new and desire to secure by Letters Patent, is:

1. In a fluid pressure brake equipment, in combination, a brake pipe, a friction opposed brake controlling valve mechanism having a position for establishing a communication through which fluid under pressure is adapted to be vented to effect a release of the brakes and operative upon a predetermined but light reduction in brake pipe pressure from said position to a position for closing such communication, and means for yieldably resisting the friction opposed movement of said brake controlling valve mechanism from said release position to the communication closing position in response to a reduction in brake pipe pressure which may occur during the usual but unintentional fluctuations in brake pipe pressure.

2. In a fluid pressure brake equipment, in combination, a brake pipe, a friction opposed brake controlling valve mechanism having a position establishing a communication through which fluid under pressure is adapted to be vented to effect a release of the brakes and being operative upon a reduction in brake pipe pressure to another position for closing said communication, and means for yieldably opposing the friction opposed movement of the mechanism to said other position upon a predetermined but light reduction in brake pipe pressure and for preventing movement of the mechanism to said other position upon a lesser reduction in brake pipe pressure such as occurs during the usual but unintentional fluctuations in brake pipe pressure.

3. In a fluid pressure brake equipment, in combination, a brake pipe, a friction opposed brake controlling valve mechanism having a position establishing a communication through which fluid under pressure is adapted to be vented to effect a release of the brakes and being operative upon a reduction in brake pipe pressure to another position for closing said communication, and means for yieldably opposing the friction opposed movement of the mechanism to said other position upon a predetermined but light reduction in brake pipe pressure, said means rendering the mechanism unresponsive to a lesser reduction in brake pipe pressure such as occurs during the usual but unintentional fluctuations in brake pipe pressure to close said communication.

4. In a fluid pressure brake equipment, in combination, a brake pipe, a brake controlling valve mechanism having a position establishing a communication through which fluid under pressure is adapted to be vented to effect a release of the brakes and being operative upon a reduction in brake pipe pressure to another position for closing said communication, and spring means for yieldably opposing movement of the mechanism to said other position upon a predetermined but light reduction in brake pipe pressure, the opposing value of said spring means being sufficient to prevent movement of the mechanism to said other position upon a lesser reduction in brake pipe pressure.

5. In a fluid pressure brake equipment, in combination, a brake pipe, a friction opposed brake controlling valve mechanism having a position establishing a communication through which fluid under pressure is adapted to be vented to effect a release of the brakes and being operative upon a reduction in brake pipe pressure from said position to a position for closing said communication and then to another position for locally venting fluid under pressure from the brake pipe, means for yieldably resisting the friction opposed movement of the mechanism to the communication closing position in response to reductions in brake pipe pressure which may occur during the usual but unintentional fluctuations in brake pipe pressure and additional means for yieldably resisting the friction opposed movement of the mechanism from the communication closing position to the brake pipe venting position.

6. In a fluid pressure brake equipment, in combination, a brake pipe, a friction opposed brake controlling valve mechanism having a position establishing a communication through which fluid under pressure is adapted to be vented to effect a release of the brakes and being operative upon a reduction in brake pipe pressure from said position to a position for closing said communication and then to another position for locally venting fluid under pressure from the brake pipe, means for yieldably resisting the friction opposed movement of the mechanism to the communication closing position in response to reductions in brake pipe pressure which may occur during the usual but unintention fluctuations in brake pipe pressure, and means adapted to cooperate with the first mentioned means for yieldably resisting the friction opposed movement of the mechanism from the communication closing position to the brake pipe venting position.

7. In a fluid pressure brake equipment, in combination, a brake pipe, a brake controlling valve mechanism having a position establishing a communication through which fluid under pressure is adapted to be vented to effect a release of the brakes and being operative upon a reduction in brake pipe pressure from said position to a position for closing said communication and then to another position for locally venting fluid under pressure from the brake pipe, spring means for yieldably resisting movement of the mechanism to the communication closing position and additional spring means brought into action in the communication closing position of the mechanism for yieldably resisting movement of the mechanism to its brake pipe venting position.

8. In a fluid pressure brake equipment, in combination, a brake pipe, a brake contolling valve mechanism having a position establishing a communication through which fluid under pressure is adapted to be vented to effect a release of the brakes and being operative upon a reduction in brake pipe pressure from said position to a position for closing said communication and then to another position for locally venting fluid under pressure from the brake pipe, spring means for yieldably resisting movement of the mechanism to the communication closing position and means brought into action by said spring means in the communication closing position for yieldably resisting movement of the mechanism to its brake pipe venting position.

9. In a fluid pressure brake equipment, in combination, a brake pipe, an equalizing valve device comprising a main valve, an auxiliary valve having friction opposed movement relative to the main valve and a friction opposed piston operated upon a reduction in brake pipe pressure for operating said valves, a normally open communication through which fluid under pressure is adapted to be vented to effect a release of the brakes, means operative upon movement of the auxiliary valve relative to the main valve for effecting the closing of said communication, and means for yieldably opposing movement of the auxiliary valve by said piston.

10. In a fluid pressure brake equipment, in combination, a brake pipe, an equalizing valve device comprising a main valve, an auxiliary valve having friction opposed movement relative to the main valve and a piston operated upon a reduction in brake pipe pressure for operating said valves, a normally open communication through which fluid under pressure is adapted to be vented to effect a release of the brakes, means operative upon movement of the auxiliary valve relative to the main valve for effecting the closing of said communication, and means cooperating with said main slide valve and piston stem for yieldably opposing movement of the auxiliary valve by said piston.

11. In a fluid pressure brake equipment, in combination, a brake pipe, an equalizing valve device comprising a main valve, an auxiliary valve having friction opposed movement relative to the main valve and a piston operated upon a reduction in brake pipe pressure for operating said valves, a normally open communication through which fluid under pressure is adapted to be vented to effect a release of the brakes, means operative upon movement of the auxiliary valve relative to the main valve for effecting the closing of said communication, and a spring for preventing movement of the auxiliary slide valve by said piston until the reduction in brake pipe pressure is sufficient to create a force on said piston great enough to overcome the opposition of said spring.

12. In a fluid pressure brake, in combination, a brake pipe, an equalizing valve device comprising a main valve, an auxiliary valve having friction opposed movement relative to the main valve and a friction opposed piston operated upon a reduction in brake pipe pressure for operating said valves, a normally open communication through which fluid under pressure is adapted to be vented to effect a release of the brakes, means operative upon movement of the auxiliary valve relative to the main valve for effecting the closing of said communication, means operative upon further movement of the auxiliary valve relative to the main valve for venting fluid under pressure from the brake pipe, and means for yieldably opposing movement of the auxiliary valve by said piston to the communication closing position and to the brake pipe venting position.

13. In a fluid pressure brake equipment, in combination, a brake pipe, an equalizing valve device comprising a main valve, an auxiliary valve having friction opposed movement relative to the main valve and a friction opposed piston operated upon a reduction in brake pipe pressure for operating said valves, a normally open communication through which fluid under pressure is adapted to be vented to effect a release of the brakes, means operative upon movement of the auxiliary valve relative to the main valve for effecting the closing of said communication, means operative upon further movement of the auxiliary valve relative to the main valve by said piston for venting fluid under pressure from the brake pipe, means yieldably opposing movement of the auxiliary valve relative to the main valve by said piston to the position for effecting the closing of said communication, and means yieldably opposing movement of the auxiliary valve by said piston from said position to the brake pipe venting position.

14. In a fluid pressure brake equipment in combination, a brake pipe, an equalizing valve device comprising a main valve, an auxiliary valve having friction opposed movement relative to the main valve and a friction opposed piston operated upon a reduction in brake pipe pressure for operating said valve, a normally open communication through which fluid under pressure is adapted to be vented to effect a release of the brakes, means operative upon movement of the auxiliary valve relative to the main valve for effecting the closing of said communication, means operative upon further movement of the auxiliary valve relative to the main valve for venting fluid under pressure from the brake pipe, means yieldably opposing movement of the auxiliary valve relative to the main valve to the communication closing position and additional means yieldably opposing movement of the auxiliary valve relative to the main valve from the communication closing position to the brake pipe venting position.

15. In a fluid pressure brake equipment, in combination, a brake pipe, an auxiliary reservoir, an equalizing valve device comprising a main valve, a graduating valve having a movement relative to the main valve, and a friction opposed piston operated upon a reduction in brake pipe pressure for operatilng said valves, said piston controlling a normally open feed groove around the piston through which fluid under pressure is supplied from the brake pipe to the auxiliary reservoir, a normally open communication through which fluid under pressure is adapted to be vented to effect a release of the brakes, means operative upon movement of said graduating valve by said piston relative to the main valve for closing said communication, the feed groove being closed by said piston in the communication closing position of the auxiliary slide valve, and yielding means opposing movement of the graduating valve relative to the main valve.

16. In a fluid pressure brake equipment, in combiantion, a brake pipe, an auxiliary reservoir, an auxiliary valve device comprising a main valve, a graduating valve having a movement relative to the main valve, and a friction opposed piston operated upon a reduction in brake pipe pressure for operating said valves, a normally open feed groove around said piston through which fluid under pressure is supplied from the brake pipe to the auxiliary reservoir and adapted to be closed upon movement of said piston, a normally open communication through which fluid under pressure is adapted to be vented to effect a release of the brakes, means operative upon movement of the auxiliary valve relative to the main valve by said piston to its feed groove closing position for effecting the closing of said communication and means for yieldably opposing movement of the auxiliary valve relative to the main valve.

17. In a fluid pressure brake equipment, in combination, with a brake pipe, an auxiliary reservoir, an equalizing valve device comprising a main valve a graduating valve having a movement relative to the main valve and a fricion opposed piston operated upon a reduction in brake pipe pressure for operating said valves, a normally open feed groove around said piston through which fluid under pressure is supplied to the auxiliary reservoir from the brake pipe and adapted to be closed upon initial movement of said piston, a normally open communication through which fluid under pressure is adapted to be vented in effecting a release of the brakes, means operative upon movement of the auxiliary slide valve relative to the main slide valve by said piston in its movement to the feed groove closing position for effecting the closing of said communication, means operative upon a further movement of said piston and said graduating valve relative to said main valve for venting fluid under pressure from the brake pipe, means for yieldably opposing movement of the graduating valve relative to the main valve to the position for effecting the closing of the said communication in response to reductions in brake pipe pressure which may occur during the usual but unintentional fluctuations in brake pipe pressure, and means for yieldably opposing movement of the graduating valve relative to the main valve from the position for effecting the closing of said communication to the brake pipe venting position.

18. In a fluid pressure brake equipment, in combination, a brake pipe, an equalizing valve device subject to variations in brake pipe pressure for controlling the application and release of the brakes and movable from release position upon a reduction in brake pipe pressure, said device in its movement being friction opposed, and means for yieldably resisting the friction opposed movement of the device from said release position to prevent any movement from the release position in response to a reduction in brake pipe pressure during the usual but unintentional fluctuations in brake pipe pressure.

19. In a fluid pressure brake equipment, in combination, a brake pipe, a relay release valve device operative upon an increase in fluid pressure for effecting the release of the brakes and operative upon a reduction in fluid pressure for cutting off communication through which fluid is vented to effect the release of the brakes, an equalizing valve device subject to variations in brake pipe pressure and having a release position in which fluid under pressure is supplied to said relay release valve device and movable upon a reduction in brake pipe pressure to effect the venting of fluid from said relay valve device, said device in its movement being friction opposed, and means for yieldably resisting the friction opposed movement of said equalizing valve device from said release position in response to a reduction in brake pipe pressure which may occur during the usual but unintentional fluctuations in brake pipe pressure.

20. In a fluid pressure brake mechanism, in combination, a brake pipe, an equalizing valve device subject to variations in brake pipe pressure for controlling the application and release of the brakes, and movable from release position upon a reduction in brake pipe pressure, said device in its movement being friction opposed, and means for yieldably resisting the friction opposed movement of the device from said release position to prevent any movement from the release position upon the usual but unintentional fluctuations in brake pipe pressure.

ELLERY R. FITCH.